3,364,193
UNDECA- AND DODECAPEPTIDES RELATED TO METHIONYL-LYSYL-BRADYKININ

Reinhard Hempel and Eberhard Schroeder, Berlin, Germany, assignors to Schering AG, Berlin, Germany, a corporation of Germany
No Drawing. Filed Aug. 23, 1965, Ser. No. 481,933
Claims priority, application Germany, Sept. 1, 1964, Sch 35,714
7 Claims. (Cl. 260—112.5)

ABSTRACT OF THE DISCLOSURE

Synthetic polypeptides having hypotensive activity, bearing the C-terminal sequence of bradykinin extended by the addition of certain amino acids to its N-terminal amino acid arginine. These compounds are prepared by condensing bradykinin with a suitable dipeptide to give a undecapeptide in one method, and substituting L-lysyl-L-lysyl for the L-methionyl group of L-methionyl-L-lysyl-bradykinin in the other method.

---

This invention relates to novel synthetic polypeptides. In another aspect it relates to a new process for the preparation of synthetic polypeptides having bradykinin-like activity.

As a result of the action of trypsin or snake poison enzymes on plasma proteins there is formed in the tissue the hormone bradykinin, a nonapeptide of the formula L-arginyl-L-prolyl-L-prolyl-glycyl-L-phenylalanyl-L-seryl-L-prolyl-L-phenylalanyl-L-arginine; it has, among others, a hypotensive action, and potentiates considerably the coronary flow in isolated hearts of different animal species.

Another bradykinin-related polypeptide, i.e., L-methionyl-L-lysyl-bradykinin, which was first isolated from bovine plasma, shows similar but more pronounced action.

It was found that by substitution of the L-methionyl group in L-methionyl-L-lysyl-bradykinin by one of D-methionyl, L-ethionyl, L-phenylalanyl, L-seryl, L-lysyl, L-lysyl-L-lysyl; or substitution of the L-seryl group in position 8 of the above-mentioned compound by a glycyl group, one obtains undeca- or dodecapeptides, some of which have a markedly potentiated bradykinin-like action, and which are as active or more active than naturally occurring L-methionyl-L-lysyl-bradykinin.

According to previous experiences in peptide chemistry this was not to be expected, since in the substitution of the N-terminal amino acid, the natural peptides usually suffer a considerable decrease of their biological efficacy. Particularly in the case of bradykinin, an amino acid substitution at the N-terminal end produced a marked loss of activity.

Table 1 shows the biological activity of the peptides of this invention. The rabbits were anesthetized with urethane (1.2 g./kg. of body weight). The peptides were administered intravenously.

TABLE I.—ACTION OF SYNTHETIC POLYPEPTIDES BLOOD PRESSURE IN THE RABBIT

| Substance | Threshold dose for a 10% decrease, ng./kg.[a] | Relative activity referred to Bradykinin=1 |
|---|---|---|
| Bradykinin | 20–50 | 1 |
| L-Met-Lys-Bradykinin | 10 | 2 |
| E$^t$h$^b$-Lys-Bradykinin | 10 | 2 |
| Phe-Lys-Bradykinin | 5 | 2 |
| D-Met-Lys-Bradykinin | 5 | 2–3 |
| Ser-Lys-Bradykinin | 5 | 3 |
| Lys-Lys-Bradykinin | 2 | 8–10 |
| Lys-Lys-Bradykinin | 2 | 8–10 |
| L-Met-Lys-[Gly$^6$-Bradykinin] | 5 | 2–3 |

[a] nanogram (0.000,000,001 g.).
[b] Eth=Ethionyl.

For the synthesis of the novel compounds, we condensed bradykinin hydrochloride (prepared from bradykinin diacetate) with a dipeptide preferentially protected with the t-butyloxycarbonyl group (see FIG. 1) or protected by the carbobenzoxy and t-butyloxycarbonyl groups (see FIG. 2) and which had been converted to the azide with t-butylnitrite, for example, such a peptide as N$^α$-carbobenzoxy-N$^ε$-tert. butyloxycarbonyl-L-lysyl-N$^ε$-tert.-butyloxycarbonyl-L-lysine hydrazide.

FIGURE 1

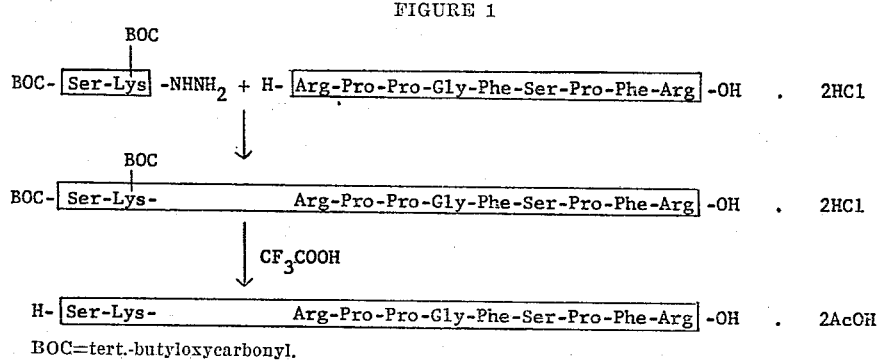

BOC=tert.-butyloxycarbonyl.

FIGURE 2

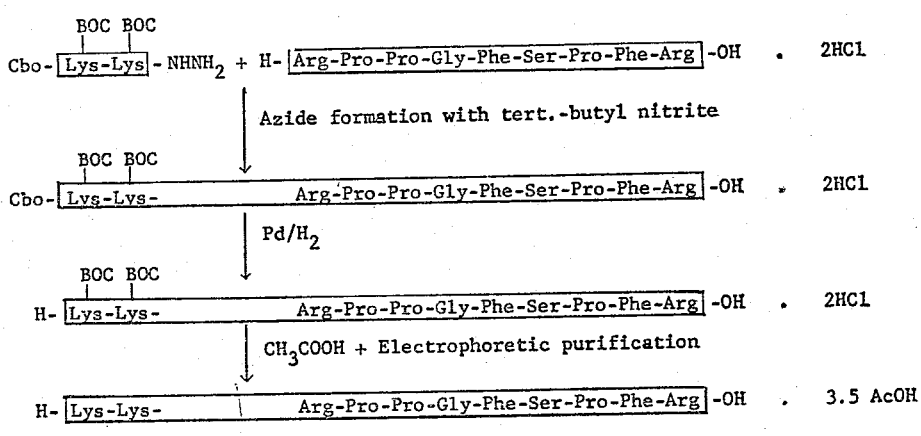

Cbo=carbobenzoxy.
BOC=tert.-butyloxycarbonyl.

The protected peptides obtained in this way may, when water soluble, be purified by preparative electrophoresis if necessary. When water insoluble or when sufficiently pure, the carbobenzoxy groups are removed immediately by catalytic hydrogenation, and the tert.-butyloxycarbonyl group by treatment with trifluoroacetic acid. The crude polypeptide trifluoroacetates are purified by preparative electrophoresis in pyridinium acetate buffer at pH 5 and are isolated by lyophilization as the acetate containing various amounts of water of hydration.

The following examples illustrate the novel synthesis of this invention, all temperatures being centigrade.

EXAMPLE 1

L-lysyl-L-lysyl-L-arginyl-L-prolyl - L - prolyl - glycyl-L-phenyl-alanyl - L - seryl-L-prolyl - L - phenylalanyl-L-arginine·3.5CH$_3$—COOH·5H$_2$O Into a solution of 192 mg. (0.3 mmole) of Nα-carbobenzoxy - N$^\epsilon$-tert.-butyloxycarbonyl - L - lysyl - N$^\epsilon$ - tert. butyloxycarbonyl-L-lysine hydrazide in 0.5 cc. of dimethylformamide and 0.3 cc. of 2.2 N of hydrochloric acid in tetrahydrofuran, one adds dropwise 0.037 cc. of tert.-butyl nitrite at −15°. After cooling for 10 minutes, the azide is neutralized with triethylamine (the triethylamine hydrochloride is separated). 386 mg. (0.3 mmole) of L-arginyl-L-prolyl-L-prolyl-glycyl-L-phenylalanyl - L-seryl-L-prolyl-L-phenylalanyl-L-arginine (diacetate hexahydrate) in 4 cc. of dimethylformamide is added to the neutralized azide, which was converted previously into the dihydrochloride by the addition of 0.6 cc. of hydrochloric acid in tetrahydrofuran. After 48 hours at 0° the solvent is distilled off under vacuum, the residue was reprecipitated from ethanol/acetic acid and triturated with cold water. One obtains 270 mg. of the protected undecapeptide. Immediately 260 mg. is hydrogenated in a methanol-glacial acetic acid-water mixture in the presence of Pd-black, and then treated for one hour with 3 cc. of trifluoroacetic acid. Precipitation with ether yielded 246 mg. of white powder which, following purification by means of carrier-free flow electrophoresis (Pheroplan) in pyridinium acetate buffer at pH 5 and lyophilization, produces a yield of 132 mg. (26%) of purified material. The compound contains 3.5 moles of acetic acid and 1 mole of H$_2$O. $[\alpha]_D^{22}$=−82.0° (c.=0.5 water) (c. is solute concentration).

EXAMPLE 2

L-lysyl-L-lysyl-L-lysyl-L-arginyl-L-prolyl - L - prolyl-glycyl-L-phenylalanyl-L-seryl-L-prolyl - L - phenylalanyl-L-arginine·5CH$_3$COOH·H$_2$O To 256 mg. (0.3 mmole) of Nα-carbobenzoxy-N'-tert.-butyloxycarbonyl-L-lysyl - N$^\epsilon$ - tert.-butyloxycarbonyl-L-lysyl-N$^\epsilon$-tert.-butyloxycarbonyl-L-lysine hydrazide in 1.5 cc. of dimethylformamide and 0.3 cc. of 2.2 N hydrochloric acid in tetrahydrofuran is added with 0.037 cc. of tert.-butylnitrite at −15°. Within 10 minutes the triethylamine is neutralized; triethylamine hydrochloride is filtered off. The filtrate is mixed with 0.3 mmole of L-arginyl-L-prolyl-L-prolyl - glycyl - L - phenylalanyl-L-seryl-L-prolyl-L-phenylalanyl - L - arginine·2HCl·6H$_2$O [made by the addition of 0.6 cc. of hydrochloric acid in tetrahydrofuran to 386 mg. (0.3 mmole) of nonapeptide diacetate]. After 48 hours at 0° the solvent is distilled off under vacuum, the residue is reprecipitated from ethanol/ethyl acetate, triturated with cold water, filtered, dried and hydrogenated in a methanol-glacial acetic acid-water mixture in the presence of Pd-black. The oily residue remaining following removal of the catalyst and concentration of the solvent in a vacuum, is agitated for one hour with 3 cc. of trifluoroacetic acid yielding, following precipitation with ether, 310 mg. of white powder. This was purified by means of preparative flow electrophoresis in pyridinium acetate buffer at pH 5 and lyophilized to yield 153 mg. (27%) of pure product containing 5 moles of acetic acid and 8 moles of water.

$[\alpha]_D^{22}$=−84.6°

(c.=0.5 water).

EXAMPLE 3

(a) Tert.-butyloxycarbonyl-L-seryl - N$^\epsilon$-tert. - butyloxycarbonyl-L-lysyl - L - arginyl - L - prolyl-L-prolyl-glycyl - L - phenylalanyl-L-seryl-L-prolyl-L-phenylalanyl-L-arginine·CH$_3$COOH·4H$_2$O A solution of 134 mg. (0.3 mmole) of tert.-butyl-oxycarbonyl-L-seryl-N$^\epsilon$-tert. - butyloxycarbonyl-L-lysine hydrazide in 3 cc. of dimethylformamide and 0.3 cc. of 2.2 N hydrochloric acid in tetrahydrofuran is agitated for 5 minutes at −20° with 0.04 cc. of tert.-butyl nitrite. Following neutralization with triethylamine and separation of triethylammonium hydrochloride by filtration, the filtrate is treated with 330 mg. (0.25 mmole) of L-arginyl-L-prolyl - L - prolyl-glycyl - L - phenylalanyl-L-seryl-L-prolyl-L-phenylalanyl-L-arginine, 2.5 diacetate hexahydrate, in 15 cc. of dimethylformamide and 0.5 cc. of hydrochloric acid in tetrahydrofuran, stands for 48 hours at 0°. The solvent is distilled off under vacuum at 0.1 mm. of mercury. The residue is triturated with ethyl acetate and reprecipitated from dimethylformamide/ethyl acetate. The gross yield is 380 mg. of product, which is almost uniform electrophoretically. The crude product was purified by carrier-free electrophoresis (Pheroplan) at pH 5. Yield is 274 mg. (68%) as monoacetate tetrahydrate. $[\alpha]_D^{23}$=−93.0° (c.=0.5 water).

(b) L-seryl-L-lysyl - L - arginyl - L - prolyl-L-prolyl-glycyl - L - phenylalanyl - L - seryl-L-prolyl-L-phenylalanyl-L-arginine·2CH$_3$COOH·6H$_2$O 144 mg. (0.09 mmole) of the above compound is treated for 45 minutes with 1.5 cc. of 95 percent trifluoroacetic acid. The crude product is precipitated with ether, dried, purified by means of preparative flow electrophoresis (pH 5), and is isolated by lyophilization. Yield is 134 mg. (99%) of electrophoretically uniform material. $[\alpha]_D^{23} = -97.1°$ (c.=0.5 water).

ether. The crude product is purified by carrier-free preparative electrophoresis (Pheroplan) at pH 5. Yield is 122 mg. (44%) of lyophilized powder.

$[\alpha]_D^{23} = -87.3°$ (c.=0.5 water).

The data on additional working examples are compiled below in Table 2.

TABLE 2

| | Protected undecapeptide | | | | | Free undecapeptide | | | |
|---|---|---|---|---|---|---|---|---|---|
| | Protective groups | Type of purification | Yield, percent | $[\alpha]_D^{23}$ | Melting point | Type of purification | Yield, percent | $[\alpha]_D^{23}$ | Isolated as— |
| Eth-Lys-Bradykinin | BOC BOC...OH | (d) | 85 | −46.5° c=0.5, DMF | Indefinite | Pheroplan, pH 5 | 44 | −87.3° c=0.5, H₂O | ·3CH₃COOH·4H₂O |
| D-Met-Lys-Bradykinin | BOC BOC...OH | (b) | 98 | −42.2° c=0.5, DMF | 162–163° (dec.) | ......do............ | 39 | −92.5° c=0.5, H₂O | ·2.5CH₃COOH·12H₂O |
| Met-Lys-Gly⁶-Bradykinin | BOC BOC...OH | (b) | 85 | −52.5° c=0.5, DMF | 156–158° (dec.) | ......do............ | 77 | −76.2° c=0.5, H₂O | ·2.5CH₃COOH·10H₂O |
| Phe-Lys-Bradykinin | BOC Cbo....OH | (a) | 43 | −70.9° c=0.5, Me | 172–174° | ......do............ | 62 | −82.0° c=0.5, H₂O | ·3CH₃COOH·6H₂O |
| Ser-Lys-Bradykinin | BOC BOC...OH | (c) | 68 | −93.0° c=0.5, H₂O | | ......do............ | 99 | −97.1° c=0.5, H₂O | ·2CH₃COOH·6H₂O |

Me=Methanol. DMF=Dimethylformamide.

For separation of the non-reacted bradykinin the following purification measures were carried out:
(a) Protected undecapeptides difficultly soluble in water were triturated with water at 0°.
(b) Protected water soluble undecapeptides were reacted again with the calculated amount of dipeptide-azide.
(c) Protected undecapeptides readily water soluble were purified at pH 5 Pheroplan.
(d) If the protected undecapeptide contained less than 10% of non-reacted bradykinin, then the protective groups were separated immediately.

EXAMPLE 4

(a) Tert.-butyloxycarbonyl - L - ethionyl-N⁶-tert.-butyloxycarbonyl - L - lysyl - L - arginyl-L-prolyl-L-prolyl-glycyl - L - phenylalanyl - L - seryl-L-prolyl-L-phenylalanyl-L-arginine 165 mg. (0.3 mmole) of tert.-butyloxycarbonyl-L-ethionyl-N⁶-tert.-butyloxycarbonyl-L-lysine hydrazide is dissolved in 3 cc. of dimethylformamide and 0.3 cc. of 2.2 N hydrochloric acid in tetrahydrofuran and treated at −20° with 0.04 cc. of tert.-butyl nitrite. After 5 minutes the azide is neutralized with triethylamine, mixed with 294 mg. (0.23 mmole) of L-arginyl-L-prolyl-L-prolyl - glycyl - L - phenylalanyl-L-seryl-L-prolyl-L-phenylalanyl-L-arginine 2 diacetate pentahydrate in 10 cc. of dimethylformamide and 0.46 cc. of 1 N hydrochloric acid in tetrahydrofuran, and stored for 48 hours at 0°. The mixture is concentrated, mixed with ethyl acetate and reprecipitated from dimethylformamide/ethyl acetate. Yield is 340 mg. (85%), melting point indefinite. $[\alpha]_D^{23} = -46.5°$ (c.=0.5 dimethylformamide).

(b) L-ethionyl - L - lysyl-L-arginyl-L-prolyl-L-prolyl-glycyl - L - phenylalanyl-L-seryl-L-prolyl-L-phenylalanyl-L-arginine 295 mg. (0.17 mmole) of protected undecapeptide was allowed to stand for one hour at room temperature with 3 cc. of trifluoroacetic acid and then precipitated with

What is claimed is:

1. A synthetic polypeptide having the general formula: R-L-lysyl - L - arginyl - L - prolyl-L-prolyl-glycyl-L-phenylalanyl - L - seryl - L - prolyl-L-phenylalanyl-L-arginine, wherein R is L-ethionyl, L-lysyl, L-lysyl-L-lysyl, D-methionyl, L-phenylalanyl or L-seryl.

2. L-ethionyl - L - lysyl-L-arginyl-L-prolyl-L-prolyl-glycyl - L - phenylalanyl-L-seryl-L-prolyl-L-phenylalanyl-L-arginine.

3. L-lysyl - L - lysyl-L-arginyl-L-prolyl-L-prolyl-glycyl-L-phenylalanyl - L - seryl-L-prolyl-L-phenylalanyl - L-arginine.

4. L-lysyl - L - lysyl-L-lysyl-L-arginyl-L-prolyl-L-prolyl-glycyl-L-phenylalanyl-L-seryl-L-prolyl - L - phenylalanyl-L-arginine.

5. D-methionyl-L-lysyl-L-arginyl-L-prolyl - L - prolyl-glycyl - L - phenylalanyl-L-seryl-L-prolyl-L-phenylalanyl-L-arginine.

6. L-phenylalanyl - L - lysyl-L-arginyl-L - prolyl - L-prolyl-glycyl - L - phenylalanyl-L-servyl-L-prolyl-L-phenylalanyl-L-arginine.

7. L-seryl - L - lysyl - L - arginyl-L-prolyl-L-prolyl-glycyl - L - phenylalanyl-L-seryl-L-prolyl-L-phenylalanyl-L-arginine.

References Cited

UNITED STATES PATENTS

| 3,216,991 | 11/1965 | Ondetti et al. | 260—112.5 |
| 3,216,992 | 11/1965 | Bodanszky et al. | 260—112.5 |
| 3,216,993 | 11/1965 | Bodanszky et al. | 260—112.5 |
| 3,216,994 | 11/1965 | Bodanszky et al. | 260—112.5 |
| 3,234,200 | 2/1966 | Bodanszky et al. | 260—112.5 |

OTHER REFERENCES

Elliott et al.: iochem. J. 87, 21P (1963).
Schroder, Experientia 21, 271–273 (1965).

LEWIS GOTTS, *Primary Examiner.*

M. M. KASSENOFF, *Assistant Examiner.*